W. A. SCRIBNER.
SELF WATERING FLOWER POT.
APPLICATION FILED NOV. 25, 1912.
1,063,395.
Patented June 3, 1913.
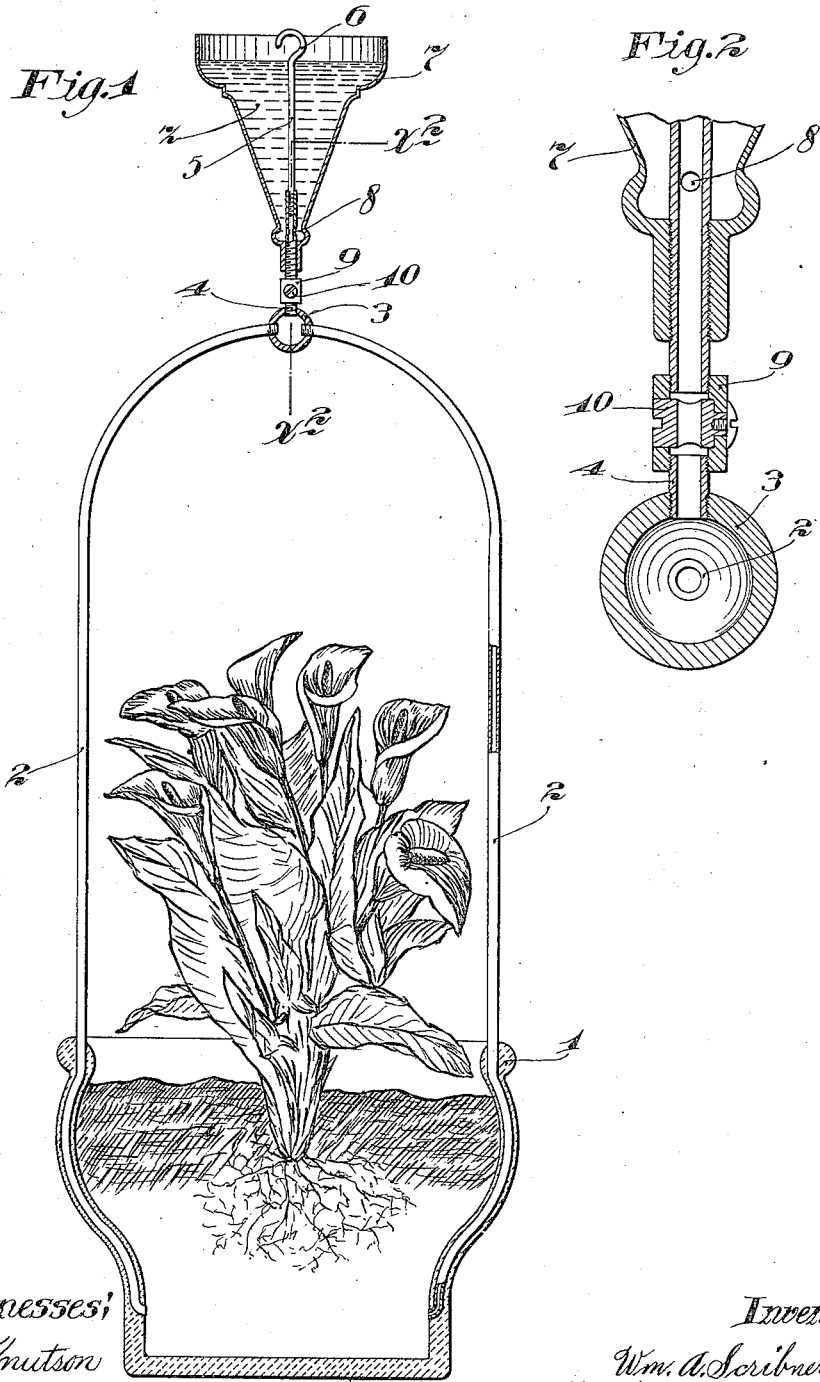
Witnesses:
Geo. Knutson
E. C. Skinkle
Inventor:
Wm. A. Scribner
By his Attorneys;
Williamson Merchant

UNITED STATES PATENT OFFICE.

WILLIAM A. SCRIBNER, OF MINNEAPOLIS, MINNESOTA.

SELF-WATERING FLOWER-POT.

1,063,395.

Specification of Letters Patent.

Patented June 3, 1913.

Application filed November 25, 1912. Serial No. 733,406.

*To all whom it may concern:*

Be it known that I, WILLIAM A. SCRIBNER, a citizen of the United States, residing at Minneapolis, in the county of Hennepin and State of Minnesota, have invented certain new and useful Improvements in Self-Watering Flower-Pots; and I do hereby declare the following to be a full, clear, and exact description of the invention, such as will enable others skilled in the art to which it appertains to make and use the same.

My invention has for its object to provide a portable self-watering flower pot, intended for general use, but especially adapted for use in cemeteries.

To the above end, generally stated, the invention consists of the novel devices and combinations of devices hereinafter described and defined in the claims.

The invention is illustrated in the accompanying drawings, wherein like characters indicate like parts throughout the several views.

Referring to the drawings: Figure 1 is a view partly in elevation and partly in central vertical section; and Fig. 2 is a detail view in vertical section, taken on the line $x^2$ $x^2$ of Fig. 1, on an enlarged scale.

The numeral 1 indicates a flower pot molded from a more or less porous material, such as clay or concrete. The lower ends of a pair of upright supporting tubes 2, which serve as water conveying conduits, are anchored to the flower pot 1 by embedding the same in the opposite walls of the flower pot 1, at the time the same is molded. At their lower ends, these tubes 2 are reversely and inwardly bent, so as to open into the interior of the flower pot 1, and deliver the water conveyed therethrough to the roots of a plant in the flower pot 1. The upper ends of the supporting tubes 2 are reversely curved or bent inward until they terminate close together in the same horizontal plane and are connected to a ball or hollow casting 3 by screw threaded water-tight joints.

Tapping the casting 3, intermediately between the two supporting tubes 2, and secured thereto by a screw threaded water-tight joint, is an upright hollow stem 4. The upper end of this stem 4 is closed, to form a water-tight joint, by screwing therein the lower end of an upright supporting rod 5, which forms a continuation of said stem. At its upper end, this rod 5 terminates in a hoop 6, adapted to be hooked over a suitable support, for holding the flower pot 1 suspended in an elevated position.

Surrounding the rod 5 and the upper end portion of the hollow stem 4 is a funnel shaped water receptacle 7, the contracted lower end of which is secured to the intermediate portion of the hollow stem 4 by a screw threaded water-tight joint. A plurality of water passages 8 is formed in the hollow stem 4, between the connected portion of the water receptacle 7 and the lower end of the supporting rod 5. Obviously, the water Z within the receptacle 7 is conveyed through the water passages 8, through the hollow stem 4, and into the hollow casting 3. From the hollow casting 3, the water is conveyed through the conduits formed in the tubes 2 into the flower pot 1. Interposed in the hollow stem 4, between the hollow casting 3 and the lower end of the water receptacle 7, is a valve casing 9, in which is mounted a valve 10, for the purpose of regulating the flow of water from the receptacle 7 to the flower pot 1.

By the manipulation of the valve 10, the flow of water from the receptacle 7 through the water conveying conduits 2 may be regulated, so that just the right amount of water is delivered to the plant. A certain amount of the water, of course, will be absorbed by the porous material, from which the flower pot is constructed, and will evaporate.

In a device as above described, plants need very little attention and the water is delivered to their roots where it is needed, instead of being poured into the open end of the flower pot 1, thereby baking the soil and often injuring plants by breaking the same and by the contact of the water with the leaves of certain plants.

The above described device, while extremely simple and of small cost to manufacture, has, in actual practice, been found highly efficient for the purpose had in view.

What I claim is:

1. The combination with a flower pot, of a water receptacle, a water-conveying conduit leading from said water receptacle to said flower pot and arranged to deliver water into said flower pot at the roots of a plant therein, the delivery end portion of said conduit being embedded in said flower pot, substantially as described.

2. The combination with a water receptacle having a discharge opening, of a flower pot, a plurality of water-conveying conduits leading from said discharge opening in said water receptacle, and having their delivery end portions embedded in and supporting said flower pot, and arranged to deliver water to the roots of the plant therein, substantially as described.

3. The combination with a suspended water receptacle having a discharge opening, of a flower pot, a plurality of water-conveying conduits leading from the discharge opening in said water receptacle to said flower pot and having their lower end portions embedded in and supporting said flower pot and arranged to deliver water to the roots of the plant therein, and a valve for regulating the flow of water from said receptacle.

In testimony whereof I affix my signature in presence of two witnesses.

WILLIAM A. SCRIBNER.

Witnesses:
HARRY D. KILGORE,
EDITH SIMERMAN.

Copies of this patent may be obtained for five cents each, by addressing the "Commissioner of Patents, Washington, D. C."